(12) United States Patent
Gajek et al.

(10) Patent No.: US 9,992,177 B2
(45) Date of Patent: Jun. 5, 2018

(54) METHOD AND SYSTEM FOR MODIFYING AN AUTHENTICATED AND/OR ENCRYPTED MESSAGE

(71) Applicants: Sebastian Gajek, Heidelberg (DE); Jan Seedorf, Heidelberg (DE); Oezguer Dagdelen, Bensheim (DE)

(72) Inventors: Sebastian Gajek, Heidelberg (DE); Jan Seedorf, Heidelberg (DE); Oezguer Dagdelen, Bensheim (DE)

(73) Assignee: NEC Corporation, Tokyo (JP)

( * ) Notice: Subject to any disclaimer, the term of this patent is extended or adjusted under 35 U.S.C. 154(b) by 120 days.

(21) Appl. No.: 14/399,293

(22) PCT Filed: Apr. 5, 2013

(86) PCT No.: PCT/EP2013/057260
§ 371 (c)(1),
(2) Date: Nov. 6, 2014

(87) PCT Pub. No.: WO2013/189619
PCT Pub. Date: Dec. 27, 2013

(65) Prior Publication Data
US 2015/0121062 A1    Apr. 30, 2015

(51) Int. Cl.
*H04L 29/06* (2006.01)
*G06F 21/60* (2013.01)
(Continued)

(52) U.S. Cl.
CPC .......... *H04L 63/0471* (2013.01); *G06F 21/10* (2013.01); *G06F 21/606* (2013.01);
(Continued)

(58) Field of Classification Search
CPC ........ G06F 21/606; G06F 21/10; G06F 21/64; H04L 63/0428
See application file for complete search history.

(56) References Cited

U.S. PATENT DOCUMENTS

2003/0196081 A1   10/2003   Savarda et al.
2004/0030912 A1*   2/2004   Merkle, Jr. ............. G06F 21/10
                                                        726/26
(Continued)

FOREIGN PATENT DOCUMENTS

WO    2007/103338 A2    9/2007

OTHER PUBLICATIONS

Ateniese et al., "Sanitizable Signatures", 2005, pp. 159-177.*
(Continued)

*Primary Examiner* — Thaddeus Plecha
(74) *Attorney, Agent, or Firm* — Young & Thompson

(57) ABSTRACT

A method and system for modifying an authenticated and/or encrypted message by a modifying party exchanged between a sending party and a receiving party based on a secure communication protocol, the method includes the steps of
a) dividing a clear message into non-modifiable parts and modifiable parts by the sending party;
b) including modifiable part information into the message by the sending party;
c) authenticating and/or encrypting the message by the sending party;
d) providing en- and decryptability and/or authenticability of the message to the modifying party in such a way that the modifying party can only modify the modifiable parts of the message;
e) modifying one or more modifiable parts by the modifying party; and
f) providing an authenticated and/or encrypted modified message according to the secure communication protocol to the receiving party.

11 Claims, 8 Drawing Sheets

(51) Int. Cl.
  G06F 21/64 (2013.01)
  G06F 21/10 (2013.01)
  H04L 29/08 (2006.01)
(52) U.S. Cl.
  CPC .......... *G06F 21/64* (2013.01); *H04L 63/0428* (2013.01); *H04L 63/123* (2013.01); *H04L 67/00* (2013.01)

(56) References Cited

U.S. PATENT DOCUMENTS

| | | | | |
|---|---|---|---|---|
| 2004/0091114 | A1* | 5/2004 | Carter | G06F 21/606 |
| | | | | 380/259 |
| 2005/0210270 | A1* | 9/2005 | Rohatgi | G06F 21/32 |
| | | | | 713/186 |
| 2006/0117183 | A1* | 6/2006 | Hatano | G06F 21/64 |
| | | | | 713/176 |
| 2007/0014397 | A1* | 1/2007 | Ukeda | G06F 21/10 |
| | | | | 380/30 |
| 2007/0014536 | A1* | 1/2007 | Hellman | G11B 27/034 |
| | | | | 386/259 |
| 2007/0033391 | A1 | 2/2007 | Hiramatsu | |
| 2007/0106908 | A1* | 5/2007 | Miyazaki | G06F 21/64 |
| | | | | 713/189 |
| 2007/0165865 | A1* | 7/2007 | Talvitie | H04L 63/0428 |
| | | | | 380/286 |
| 2008/0130893 | A1* | 6/2008 | Ibrahim | G06F 21/572 |
| | | | | 380/277 |
| 2010/0031051 | A1* | 2/2010 | Machani | G06Q 20/3829 |
| | | | | 713/181 |
| 2012/0066313 | A1* | 3/2012 | Ban | G06F 9/546 |
| | | | | 709/206 |
| 2013/0166960 | A1* | 6/2013 | Das | H04L 43/50 |
| | | | | 714/47.1 |
| 2013/0191642 | A1* | 7/2013 | Loughry | G06F 21/64 |
| | | | | 713/176 |
| 2013/0268764 | A1* | 10/2013 | Valdes | G06F 21/552 |
| | | | | 713/178 |
| 2014/0355069 | A1* | 12/2014 | Caton | H04N 1/0087 |
| | | | | 358/3.28 |

OTHER PUBLICATIONS

Brzuska et al., "Security of Sanitizable Signatures Revisited", 2009, pp. 317-336.*
Agrawal et al., "Sanitizable signatures with strong transparency in the standard model", 2009, 21 pages.*
Fehr et al., "Sanitizable Signcryption: Sanitization over Encrypted Data (Full Version)", 2015, pp. 1-38.*
Brzuska et al., "Sanitizable Signatures: How to Partially Delegate Control for Authenticated Data", 2009, pp. 117-128.*
International Search Report, dated Aug. 5, 2013, from corresponding PCT application.

* cited by examiner

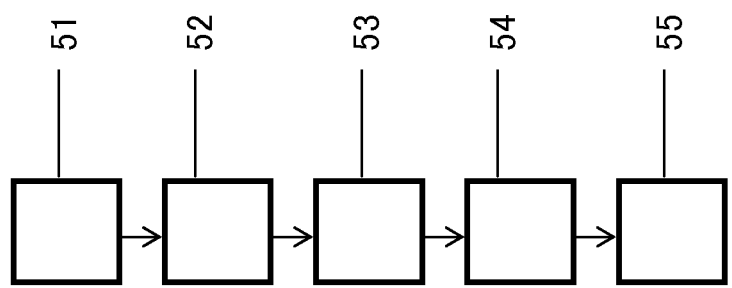

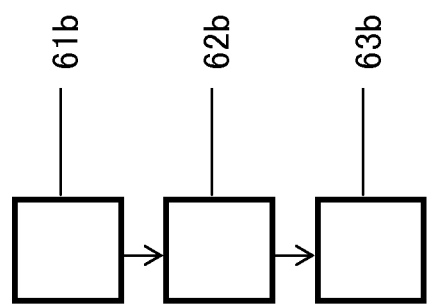

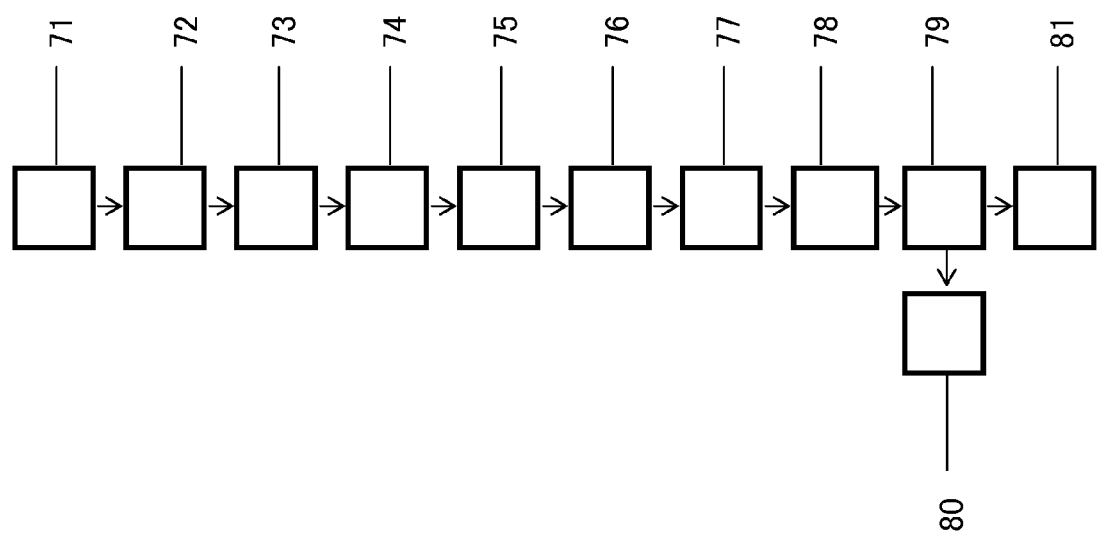

US 9,992,177 B2

METHOD AND SYSTEM FOR MODIFYING AN AUTHENTICATED AND/OR ENCRYPTED MESSAGE

The present invention relates to a method for modifying an authenticated and/or encrypted message by a modifying party exchanged between a sending party and a receiving party based on a secure communication protocol.

The present invention relates also to a system for modifying an authenticated and/or encrypted message by a modifying party exchanged between a sending party and a receiving party based on a secure communication protocol.

BACKGROUND OF THE INVENTION

Securing communication in distributed networks like the internet or mobile communication networks, e.g. 3G or LTE is a building block for a large number of applications. Conventional methods for securing communication are based for example on the SSL, IPSEC or SSH protocol. These protocols have been developed or designed decades ago when the underlying network topology was end-to-end oriented, meaning a client-to-server communication. A key requirement was to assess the confidentiality of the message and the message integrity. Any modification of messages was regarded as security breach.

One of the problems of using such protocols is, that they limit the flexibility of applications. Communication today is coupled more loosely. For example, in cloud-computing multiple parties interact with different services which are again distributed on different physical machines. For instance, the cloud provider contracts some web accelerator to embed a message template on the behalf of the cloud into the communication between a mobile device and the cloud provider. Usage of conventional security protocols does not allow the web accelerator to engage in the corresponding communication. To overcome this problem, service providers disseminate their secret key material, for example in form of long term keys, to intermediates.

However, this raises great security problems: Intermediates may easily impersonate the service provider and cause damage, for example by exploiting information of users of the service provider or the like. Since conventional secure protocols are designed in such a way that minor modifications to a message yield to a message rejection, even minor changes are delicate and require much care.

In the non-patent literature of Agrawal and Boneh, Homomorphic MACS: MAC-Based Integrity for Network Coding, in: ACNS 2009, LNCS 5536, pp. 292-305 a homomorphic message authentication code for network coding is described. Intermediate nodes in the underlying network may combine authenticated messages while preserving authenticity. In the non-patent literature of Boneh and Freeman, in: PKC'11 linearly homomorphic signatures for small fields are described. Even further a generized method for obtaining homomorphic signatures from previous signature schemes are described. Even further the homomorphism was extended to polynomial function as described in Boneh and Freeman, Homomorphic Signatures for Polynomial Functions, in: EUROCRYPT'12. One of the drawbacks of the above mentioned methods is that these methods are only useful for asymmetric settings due to the use of digital signatures where a signer and a verifier have different key material. However, digital signatures are useless when modifying encrypted messages.

In the non-patent literature of Ahn, Boneh, Camenisch, Hohenberger, Shealt, Waters: Computing on Authenticated Data, in: TCC 2012:1-20 an orthogonal method for computing on encrypted data is described. Message tags are derived for a message being valid relative to a predicate over a previous set of messages. In the non-patent literature of Rosario Gennaro, Daniel Wichs: Fully Homomorphic Message Authenticators, IACR Cryptology ePrint Archive 2012: 290 (2012) fully homomorphic message authenticators are defined using an underlying primitive fully-homomorphic encryption mechanism. However, one of the drawbacks is, that one is limited to compute a polynomial function over the messages while preserving the validity of accumulated message tags.

SUMMARY OF THE INVENTION

It is therefore an objective of the present invention to provide a method for modifying an encrypted message without leading to a rejection of that message by a receiver when a message was modified in an allowable way.

It is a further objective of the present invention to provide a method and a system enabling a modifying party to be held back from modifying message parts which the modifying party is not allowed to modify.

It is a further objective of the present invention to provide a method and a system for modifying an encrypted message which can be easily implemented, preferably in conventional protocols and enable an enhanced flexibility for applications.

According to the invention the objectives are accomplished by a method and a system as recited by the claims of the application and described below.

According to the invention, a method is provided for modifying an authenticated and/or encrypted message by a modifying party exchanged between a sending party and a receiving party based on a secure communication protocol.

According to a non-limiting, preferred embodiment of the invention, the method is characterized by a) Dividing a clear message into non-modifiable parts and modifiable parts by the sending party,
b) Including modifiable part information into the message by the sending party,
c) Authenticating and/or encrypting the message by the sending party,
d) Providing en- and decryptability and/or authenticability of the message to the modifying party in such a way that the modifying party can only modify the modifiable parts of the message,
e) Modifying one or more modifiable parts by the modifying party and
f) Providing an authenticated and/or encrypted modified message according to the secure communication protocol to the receiving party.

According to another embodiment of the invention, a system is provided for modifying an authenticated and/or encrypted message by a modifying party exchanged between a sending party and a receiving party based on a secure communication protocol, preferably for performing with a method in accordance with the invention.

According to a non-limiting, preferred embodiment of the invention, the system is characterized in that the sending party is operable to divide a clear message into non-modifiable parts and modifiable parts, to include modifiable part information into the message, and to authenticate and/or to encrypt the message by the sending party, that the modifying party is operable to be provided with en- and decryptability and/or authenticability of the message in such a way that the modifying party can only modify the modifiable parts of the message, and to modify one or more modifiable parts by the modifying party and that the receiving party is operable to receive the authenticated and/or encrypted modified message according to the secure communication protocol and preferably is operable to check security integrity according to the secure communication protocol of a received message.

According to the invention it has been recognized that the method and the system according to the invention can easily be integrated in existing flagship protocols, such as TLS.

According to the invention it has further been recognized that a modifying party is prevented from modifying message parts for which the modifying party does not have the permission to change them.

According to the invention it has further been recognized that by including modifiable part information into the message, the modifying party can identify modifiable parts of the message and the modifying party is held back from changing for example order and content of the non-modifiable and modifiable parts of the message.

According to the invention it has been further recognized that providing authenticability or authenticity and/or en- and decryptability of the message to the modifying party in such a way that the modifying party can only modify the modifiable parts of the message, the modifying party is provided with a so-called trapdoor to delete and/or modify predetermined portions or parts of the encrypted and/or authenticated message. Therefore it has further been recognized that the present invention is inherently non-homomorphic.

Further features, advantages and preferred embodiments are described in the claims and as follows.

According to a preferred embodiment a key tuple for encrypting/decrypting the message according to the secure communication protocol and a sanitizing key tuple for modifying the modifiable parts are generated. This enables an easy way to provide en- and decryptability of the message to the modifying party since for example the modifying party can use the sanitizing key tuple for changing parts of the message for further processing.

According to a further preferred embodiment the clear message is divided into a message header and a message payload and the modifiable part information is encoded into the message header. This enables an easy implementation of modifiable part information into a message and enables separating message content and message related information.

According to a further preferred embodiment the clear message is encrypted with the encryption key according to the secure communication protocol in a first message part and the message identification information is authenticated with the sanitizing key tuple in a second message part in step c). A modifying party is for example then given a session key of the secure communication protocol for decrypting the encrypted message with the message identification information.

According to a further preferred embodiment for modifying, both message parts are decrypted wherein the modifiable parts are identified based on the decrypted modifiable part information. The modifying party can then extract the message parts which are subjected to modification in an easy and efficient way.

According to a further preferred embodiment a hash value is generated for indicating security integrity of a message prior to modification and for step f) a hash function is used providing a value identical to the generated hash value for the modified message. This enables in a very efficient way so that the receiving party may easily check the security integrity of the message according to the message authentication code.

According to a further preferred embodiment the hash function is a chameleon hash function. By using a chameleon hash function hash collisions may be computed with the function, i.e. the modifying party may compute identical hash values for messages of his choice. For example, given a secret key the chameleon hash function may generate randomness for a different message so that the hash value is identical.

According to a further preferred embodiment a message tag is generated based at least on a sanitizing key tuple, the key tuple and the modifiable part information.

This allows a message to be tagged with the necessary information for encrypting, decrypting and verifying message security.

According to a further preferred embodiment steps a)-c) include the substeps of g1) choosing a random number for each modifiable part,
g2) generating a message header including the random numbers and modifiable part information,
g3) generating a message tag,
g4) encrypting and authenticating the message with the encryption key into a first part,
g5) encrypting a secure communication protocol session key and a message ID represented by the hash value for the message header with the sanitizable key tuple into a second part, and
g6) combining, preferably by concatenating, the first and second part.

This enables an easy implementation of the steps a), b) as well as c) and an efficient processing of these steps.

According to a further preferred embodiment steps d) and e) include the substeps of h1) decrypting the second part,
h2) decrypting the first part based on the decrypted second part,
h3) identifying the modifiable parts,
h4) modifying one or more modifiable parts,
h5) encrypting the modified message with key tuple.

This enables in an easy and efficient way a modifying party to modify the message according to privileges given to the modifying party and preserving security integrity of the message for a receiving party.

According to a further preferred embodiment security integrity of the modifying message is checked by recomputing the hash values of the modifiable and non-modifiable parts of the modified message, by generating a new message tag from the recomputed hash values and by comparing the new message tag with the message tag of the original message. This provides a fast and efficient checking of the security integrity of the message.

BRIEF DESCRIPTION OF THE DRAWINGS

There are several ways how to design and further develop the teaching of the present invention in an advantageous way. To this end it is to be referred to the patent claims on the one hand and to the following explanation of preferred embodiments of the invention by way of example, illustrated by the figure on the other hand. In connection with the explanation of the preferred embodiments of the invention by the aid of the figure, generally preferred embodiments and further developments of the teaching will be explained. In the drawings

FIG. 5 shows a flow diagram of a part of a method according to a fifth embodiment of the present invention;

FIG. 6b shows a flow diagram of a part of a method according to a seventh embodiment of the present invention; and FIG. 7 shows a flow diagram of a part of a method according to an eighth embodiment of the present invention.

DETAILED DESCRIPTION OF THE PREFERRED EMBODIMENTS

Figure 1:
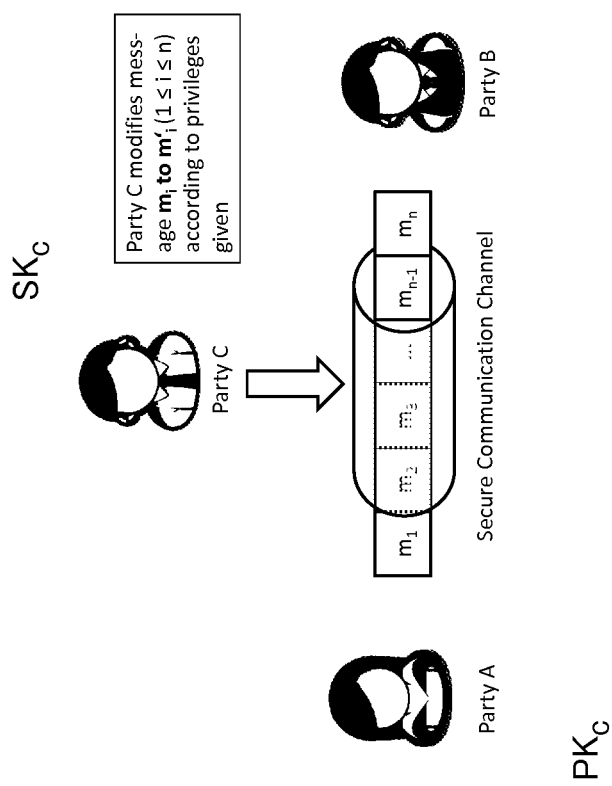
FIG. 1 shows schematically a method according to a first embodiment of the present invention.

FIG. 1 shows schematically a method according to a first embodiment of the present invention.

In FIG. 1 an interceptable secure communication allowing a delegated party C to have control access to a confidential and authenticated message is shown. Two parties A and B establish a secure communication and a third party C wishes to alter a message $m=m_1| \ldots |m_n$. The sending party A knows the public encryption key $PK_S$ of the modifying party C for which the modifying party C holds the corresponding secret key $SK_S$. The modifying party C modifies part of the message denoted with $m_i$ to $m'_i$ with $1 \leq i \leq n$ according to the privileges given to the modifying party C. The party A sends the message m to party B and delegates party C to modify blocks of the message according to a predetermined set ID comprising indexes i of message parts $m_i$ to be modified.

Figure 2:
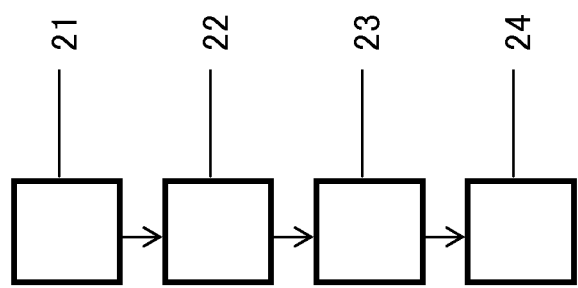
FIG. 2 shows a flow diagram of a method according to a second embodiment of the present invention.
Figure 3:
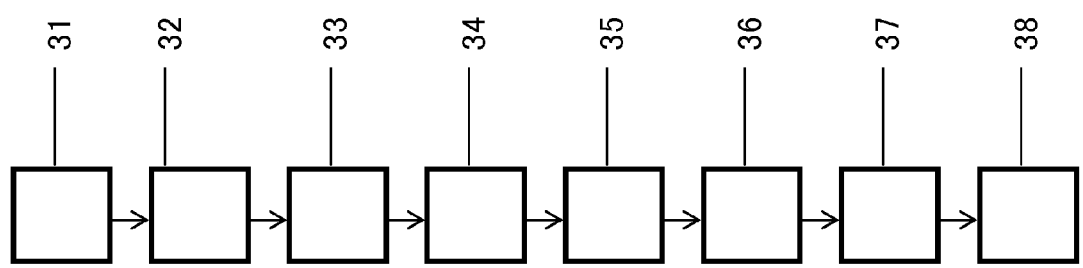
FIG. 3 shows a flow diagram of a part of a method according to a third embodiment of the present invention.
Figure 4:
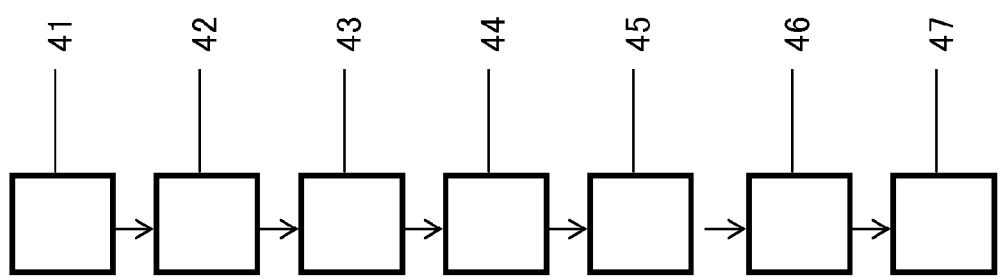
FIG. 4 shows a flow diagram of a part of a method according to a fourth embodiment of the present invention.

Before describing encryption modifying and decryption in detail with regard to FIG. 3-FIG. 5 based on FIG. 1, the principle message authentication scheme is described in FIG. 2.

In a first step 21 a sanitizable key generation generation algorithm sKeyGen on input a security parameter n outputs a secret key SK and a sanitization key tuple ($PK_{san}$, $SK_{san}$).

In a second step 22 a tagging algorithm sMAC on input a secret key SK, a sanitizing public key $PK_{san}$, a message m, randomness r, and an index set ID, outputs a tag t.

In a third step 23 a verification algorithm sVrfy on input a secret key SK, a sanitizing public key $PK_{san}$, a message m, tag t, the set of modified blocks ID with its corresponding randomness r, outputs true if the tag t is a valid tag of message m for secret key SK; otherwise it outputs false.

And in a fourth step 24 a sanitizing algorithm Sanit on input a message m authenticated by tag t, and randomness r, secret key SKsan, and a message m', outputs randomness r' such that the verification algorithm sVrfy(SK, $PK_{san}$, m', ID, r', t)=true.

Summarizing the steps 21-24 the message is splitted into blocks or parts and all message blocks are hashed prone to interference through a chameleon hash function and all message blocks are authenticated afterwards via a standard message authentication scheme MAC. Using a chameleon hash function allows with the use of modifiable part information to compute collusions, i.e. compute a hash for a modified message. Due to the identical hash value the message authentication scheme, MAC check of the message blocks even when modified is positive, i.e. the message has security integrity according to the MAC.

FIG. 3 shows a flow diagram of a part of a method according to a third embodiment of the present invention.

In a first step 31 party A or party B generates a sanitizing key tuple $PK_{san}$, $SK_{san}$ and bootstraps modifying party C with $SK_{san}$, for example by using out-of-band communication.

In a second step 32 party A and party B run a key exchange protocol and as a result both parties A and B derive an encryption and authentication key $K_{enc}$ and $K_{mac}$ respectively.

In the following is assumed a uni-directional communication and further that the message m encodes a sequence number.

When party A sends now a message m to party B and wishes that modifying party C interferes the message blocks in ID, then party A secures the message m in a second step 32 by choosing a random number $r_i$ for blocks i∈ID. Then in a third step 33 a message tag t over $m=m_1| \ldots |m_n$ using randomness $r=| \ldots |r_n$ where t=sMAC(SK, $PK_{san}$, m, r, ID) is generated.

In a fourth step 34 a message header h=<$r_i$, i> with i∈ID containing randomness r and pointers i of modifiable message blocks $m_i$ is computed.

In a fifth step 35 and in a sixth step 36 header h and payload $m_1|m_2| \ldots |m_n$ is encrypted and authenticated, i.e. $C_1$=Enc($K_{enc}$, h|m|t).

In a seventh step 37 the session key $K_{enc}$ and the message id $m_{id}$=hash(h) being the hash over the header, i.e. $C_2$=Enc($PK_S$, $m_{id}|K_{enc}$) is encrypted with a sanitizer's public key $PK_S$. $m_{id}$ aids the modifying party C to verify that $K_{enc}$ is the right key to properly decrypt the message header h and message payload $C_1$.

In an eighth step 38 C=($C_1|C_2$) is outputted. If C is not the initial ciphertext, then $C_2$ may be left out.

FIG. 4 shows a flow diagram of a part of a method according to a fourth embodiment of the present invention.

In FIG. 4 a flow diagram is shown when the modifying party C receives a message for modification. In a first step 41 upon receiving a message C=($C_1|C_2$), the modifying party C decrypts message id and session key ($m_{id}|K_{enc}$)=Dec($SK_S$, $C_2$).

In a second step 42 the modifying party C decrypts $C_1$ with the session key $K_{enc}$ and obtains (h|m|t)=Dec($K_{enc}$, $C_1$).

In a third step 43 the modifying party C checks that the message $m_{id}$=hash(h). If not, it aborts.

In a fourth step 44 the modifying party C parses h=<$r_i$, i> with i∈ID and identifies all i's as the block messages subjected to modification. This way, the modifying party C learns ID.

In a fifth step 45 the modifying party C recomputes randomness $r_i'$ in order to replace message $m_i$ with $m_i'$ by invoking $$r_i'=CAdapt(PK_{san},SK_{san},m_i,r_i,m_i').$$

In a sixth step 46 the modifying party C replaces the original header h with the new header with new randomness h'=<$r_i'$, i>.

In a seventh step 47 the modifying party C encrypts the modified header h' and payload $C_1'$=Enc($K_{enc}$, h'|m|t) and sends $C_1'$ to the party B for further processing.

FIG. 5 shows a flow diagram of a part of a method according to a fifth embodiment of the present invention.

In FIG. 5 is shown a flow diagram when the receiving party B receives an encrypted modified message.

In a first step 51 upon receiving the message $C_1'$, the receiving party B decrypts with its sessions key $K_{enc}$ the ciphertext.

In a second step 52 (h'|m'|t')=Dec($K_{enc}$, $C_1$') is obtained.

In a third step 53 the necessary parameters, namely randomness r and blocks i∈ID are extracted from the header h'=<$r'_i$, i> to check the validity of the message tag t.

In a fourth step 54 the receiving party B runs the verification algorithm sVrfy(SK, m', t', $PK_{san}$, ID, r') and accepts m', if t' is a valid tag. Otherwise, in a fifth step 55 the message m' is rejected by the receiving party B.

Figure 6A:
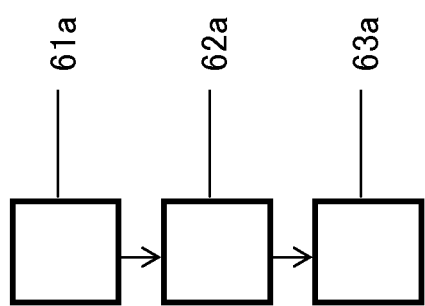
FIG. 6a shows a flow diagram of a part of a method according to a sixth embodiment of the present invention.

FIG. 6a shows a flow diagram of a part of a method according to a sixth embodiment of the present invention.

In FIG. 6a steps for providing a chameleon hash function are schematically shown.

In a first step 61a a key generation algorithm CHKeyGen on input a security parameter n outputs a key pair ($PK_{san}$, $SK_{san}$).

In a second step 62a the hashing algorithm CHash takes as input the public key $PK_{san}$, a message m, and randomness r and outputs a hash value h=CHash($PK_{san}$, m, r).

In a third step 63a a collision-finding algorithm CHAdapt on input a public key $PK_{san}$, a secret key $SK_{san}$, messages m, m' and randomness r, outputs randomness r' such that $$CHash(PK_{san}, m, r) = CHash(PK_{san}, m', r').$$

To summarize provided the secret key $SK_{san}$ and the input parameters to the chameleon hash function, a randomness for a different message m' is generated such that the hash values of the different message m' and the original message m are identical.

FIG. 6b shows a flow diagram of a part of a method according to a seventh embodiment of the present invention.

In FIG. 6b a collision resistant hash function and a standard message authentication code consisting of three steps 61b-63b is shown.

In a first step 61b a key generation algorithm KeyGen on input a security parameter n outputs a secret key SK.

In a second step 62b the tagging algorithm Mac on input the secret key SK, a message m, outputs a tag t and in a third step 63b the verification algorithm Vrfy on input the secret key SK, the message m and tag t, checks that t is a valid tag of message m for secret key SK. If so, it outputs 1 else 0 is outputted.

FIG. 7 shows a flow diagram of a part of a method according to an eighth embodiment of the present invention.

In FIG. 7 a sanitizable message authentication code method is shown. It is assumed that the message m consists of n data chunks m=$m_1|m_2| \ldots |m_n$. The following steps enable a modifying party holding the trapdoor key $SK_{san}$ to replace a batch $m_i$ with $m'_i$ for any i∈ID:

In a first step 71 the key generation algorithm sKeyGen on security parameter n invokes CHKeyGen(n) to obtain a sanitizing key tuple ($PK_{san}$, $SK_{san}$).

In a second step 72 KeyGen(n) computes a secret key SK for the standard MAC scheme.

In a third step 73 for every message $m_i$ for i∈ID a chameleon hash is computed $h_i$=CHash($PK_{san}$, $m_i$, $r_i$) and for any non-modifying message block i∉ID a standard hash $h_i$=Hash($m_i$) is computed in a fourth step 74.

In a fifth step 75 a tag t is computed according to a tagging algorithm MAC: t=Mac(SK, $h_1| \ldots |h_n$) for all 1≤i≤n and in a sixth step 76 the tag t is outputted.

In a seventh step 77 a verification method takes as input the secret key SK, the message m, the tag t, the sanitizing public key $PK_{san}$, the set of modified blocks ID and the randomness r of the modified blocks.

In an eighth step 78 the validity of the message tag t is verified by recomputing the hash values $h_i$ of the message blocks: In case of a modification the verification method uses the chameleon hash function on messages in ID with randomness $r_i$ otherwise the standard hash algorithm is used.

In a ninth step 79 the tag t is accepted if it equals the original tag generated by the tagging algorithm MAC(SK, $h_1| \ldots |h_n$). In a tenth step 80 the message is rejected otherwise.

In a further step 81 following step 79 the sanitizing algorithm Sanit on input a sanitizing public key $PK_{san}$, a message m, and randomness r, secret key $SK_{san}$ and a new message m', invokes an adapting/modifying algorithm CAdapt($PK_{san}$, $SK_{san}$, m, m', r) to obtain r', i.e. the randomness for modified message (block) m'.

In summary the present invention allows to alter messages in transit between two parties communicating via a secure communication protocol by designating privileges to a modifying party for modifying the message. Further the present invention provides a concrete header/payload format for efficient usage of chameleon hashes in data communications and enables efficient interceptable communication and deployment of the header/payload format in practice.

With the present invention control to modify authenticated messages is delegated without the capability of impersonation: A sender may define online what message chunks intermediates may alter. Further the present invention provides invisibility to a receiver: a receiver is not able to distinguish an unmodified message from an admissibly modified message ensuring that the receiver may properly decode encrypted messages. A further advantage of the present invention is that arbitrary implementation of chameleon hashes and message authentication schemes are used in order to overcome performance penalties or interoperability problems. Even further the present invention may be easily integrated in existing flagship protocols such as TLS via the addition of a new cipher specification. The present invention is inherently non-honomorphic providing an efficient secure channel protocol for secure communication. Even further the present invention enhances flexibility, since a sender may delegate privileges to modify messages when sending the messaging and by incorporation of this information into the message.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for modifying a clear message, which is to be at least one of authenticated and encrypted by a modifying computing device exchanged between a sending computing device and a receiving computing device based on a secure communication protocol, the method comprising:
   a) dividing the clear message into non-modifiable parts and modifiable parts by the sending computing device;
   b) including modifiable part information into the message by the sending computing device, said modifiable part information being encoded into a message header of the message;
   c) encrypting the clear message by the sending computing device, the clear message being encrypted with an encryption key according to the secure communication protocol in a first message part, and message identification information being authenticated with a sanitizing key tuple in a second message part;

d) providing data to the modifying computing device that enables the modifying computing device to perform encrypting and decrypting of the clear message that was encrypted by the sending computing device, the data being such that the modifying computing device is enabled to modify the modifiable parts of the clear message but not enabled to modify any other parts of the clear message;

e) modifying one or more modifiable parts by the modifying computing device based on an evaluation of the modifiable part information; and f) providing at least one of an authenticated and encrypted modified message according to the secure communication protocol to the receiving computing device.

2. The method according to claim 1, wherein a key tuple for encrypting/decrypting the clear message according to the secure communication protocol and a sanitizing key tuple for modifying the modifiable parts are generated.

3. The method according to claim 1, wherein for modifying, both the non-modifiable parts and modifiable parts are decrypted, and the decrypted modifiable parts are identified based on decrypted modifiable part information.

4. The method according to claim 1, wherein a hash value is generated for indicating security integrity prior to modification and for step f) a hash function is used for providing a value identical to the generated hash value for the modified message.

5. The method according to claim 4, wherein the hash function is a chameleon hash function.

6. The method according to claim 1, wherein a message tag is generated based at least on the sanitizing key tuple, a key tuple, and the modifiable part information.

7. The method according to claim 1, wherein steps a)-c) include the substeps of:
g1) choosing a random number for each modifiable part,
g2) including the random numbers in the message header,
g3) generating a message tag,
g4) providing the first message part, including the message being encrypted and authenticated with the encryption key,
g5) providing the second message part including an encrypted secure communication protocol session key and an encrypted message id represented by a hash value for the message header with a sanitizable key tuple, and
g6) combining the first and second message parts into a single message.

8. The method according to claim 7, wherein steps d) and e) include the substeps of
h1) decrypting the second message part,
h2) decrypting the first message part based on the decrypted second message part,
h3) identifying the modifiable parts,
h4) modifying one or more modifiable parts,
h5) encrypting the modified message with key tuple ($K_{enc}$).

9. The method according to claim 1, wherein security integrity of the modified message is checked by recomputing hash values of the modifiable and non-modifiable parts of the modified message, by generating a new message tag from the recomputed hash-values and by comparing the new message tag with a message tag of the clear message.

10. A system for modifying a clear message that is to be any of authenticated and encrypted, comprising:
a modifying computing device;
a sending computing device; and
a receiving computing device,
the modifying computing device configured to modify the clear message, which is exchanged between the sending computing device and the receiving computing device, based on a secure communication protocol,
wherein the sending computing device is configured to
divide the clear message into non-modifiable parts and modifiable parts,
include modifiable part information into a message header of the message, and
encrypt the clear message of the sending computing device, the clear message being encrypted with an encryption key according to the secure communication protocol in a first message part, and message identification information being authenticated with a sanitizing key tuple in a second message part,
wherein the modifying computing device is configured to receive data that enables the modifying computing device to perform encrypting and decrypting of the clear message that was encrypted by the sending computing device, the data being such that the modifying computing device is enabled to modify the modifiable parts of the message but not enabled to modify any other parts of the message,
wherein a modification of one or more modifiable parts by the modifying computing device is based on an evaluation of the modifiable part information, and
wherein the receiving computing device is operable to receive any of an authenticated and encrypted, modified or non-modified message according to the secure communication protocol from the modifying computing device.

11. The system according to claim 10, wherein the receiving computing device is further operable to check security integrity according to the secure communication protocol of a received message.

* * * * *